US008606071B2

(12) United States Patent
Remennik et al.

(10) Patent No.: US 8,606,071 B2
(45) Date of Patent: Dec. 10, 2013

(54) METHOD AND APPARATUS FOR PRESENTING INTERACTIVE MULTIMEDIA USING STORAGE DEVICE INTERFACE

(76) Inventors: Leonid Remennik, Nazareth-Illit (IL); Henry Broodney, Haifa (IL)

( * ) Notice: Subject to any disclaimer, the term of this patent is extended or adjusted under 35 U.S.C. 154(b) by 150 days.

(21) Appl. No.: 13/087,401

(22) Filed: Apr. 15, 2011

(65) Prior Publication Data

US 2011/0255841 A1 Oct. 20, 2011

Related U.S. Application Data

(60) Provisional application No. 61/324,325, filed on Apr. 15, 2010.

(51) Int. Cl.
*H04N 5/932* (2006.01)
*H04N 5/935* (2006.01)
*H04N 5/765* (2006.01)
*H04N 5/775* (2006.01)
*H04N 9/80* (2006.01)
*H04N 5/917* (2006.01)

(52) U.S. Cl.
USPC ........... 386/201; 386/200; 386/230; 386/239; 386/328; 386/355

(58) Field of Classification Search
USPC ................ 386/200–234, 239–248, 326–342, 386/353–357
See application file for complete search history.

(56) References Cited

U.S. PATENT DOCUMENTS

| 5,878,271 | A | * | 3/1999 | Crump et al. ..................... 710/1 |
| 6,898,799 | B1 | * | 5/2005 | Jarman ............................ 725/25 |
| 2001/0041062 | A1 | * | 11/2001 | Ottesen et al. ................. 386/125 |
| 2002/0073277 | A1 | * | 6/2002 | Butterworth et al. ......... 711/113 |
| 2003/0002583 | A1 | * | 1/2003 | Geerlings ................. 375/240.12 |
| 2005/0289637 | A1 | * | 12/2005 | Burke et al. ................... 725/138 |
| 2010/0290536 | A1 | * | 11/2010 | Iwahashi et al. .......... 375/240.25 |

FOREIGN PATENT DOCUMENTS

WO  WO 2009/093292 A1 * 7/2009 .............. H04N 7/26

* cited by examiner

*Primary Examiner* — Hung Dang

(57) ABSTRACT

A media-rendering apparatus for real-time streaming of audio/video (AV) data to a media-player having one or more input direct-access-storage-device (DASD) interfaces, the apparatus including a real-time AV data source unit, an input frame buffer operatively coupled with the real-time AV data unit, an AV real-time encoder, an encoded-frames buffer, a power source, a storage-device content emulator and a DASD interface device for communicating with the media-player. Preferably, power is provided through the DASD interface device.

17 Claims, 5 Drawing Sheets

METHOD AND APPARATUS FOR PRESENTING INTERACTIVE MULTIMEDIA USING STORAGE DEVICE INTERFACE

FIELD OF THE INVENTION

The present invention relates to multimedia presentation systems and more particularly to an apparatus, method and system for presenting real-time/interactive multimedia using storage device interface, wherein a media-rendering apparatus is operatively coupled to a multimedia-player, via a particular DAS interface device.

BACKGROUND OF THE INVENTION

A media output device is facilitated to directly interact with one or more human sensory organs, to thereby deliver the media content to the human being. For example a TV screen is facilitated to project a picture towards a human eye to deliver visual information, while speakers generate mechanical air waves that interact with a human's ears to deliver audio information. A media-rendering device is facilitated to receive multimedia, typically in some encoded form, and with optional human input process the media and generate multimedia output that a media output device can present to human. That is, a media-rendering device usually requires a media output device to deliver information to an end-user. Sometimes the media-rendering device and the media output device are integrated into a single device.

A common problem with interactive multimedia devices is connecting a media-rendering device to a media presentation device.

Media-rendering devices, generating passive multimedia, include CD-players and MP3 players for audio providing devices, and satellite/cable receivers and DVD/MP4/PVR players for audio-video multimedia providing devices. Media-rendering devices, generating interactive multimedia, include music synthesizers for audio providing devices, and PCs, game consoles and smart phones for audio-video providing devices.

The term "audio/video", as used herein with conjunction with data type, refers to audio data, video data or both audio and video data.

Media output devices include wired and wireless head phones, home and car stereo systems for audio playing devices, and monitors, TVs and projectors for video playing devices.

One problem with interactive multimedia devices is in the communication required between a coupled media-rendering device and media output device. A number of dedicated multimedia interfaces and connectors exist for the purpose of interconnecting theses devices, ranging from common RGB and RCA for video data transfer, and SPDIF and TRS in audio data transfer, as well as AD2P for wireless audio and HDMI combining both video and audio data transfer.

While dedicated media connection interface standards exist, many media-rendering devices and media rendering-and-presenting devices lack these interfaces due to physical and economical constraints. On the contrary these media-rendering devices may contain interface that is or can be used as storage device interface. For example digital frames and portable DVD players usually can display media stored on attached USB or SD storage device but lack standard audio/video input preventing them from acting as standard media presenting device.

Power supply usually required by both media presenting devices and media-rendering devices. Battery power allows some period of operation without being connected to external power source, but requires dedicated hardware implementation in both media presenting devices and media-rendering devices, and frequent recharging by connecting to external power source. Common configuration of media-rendering device connected to media presenting device by standard multi-media interface will require both devices to be connected to external power source at some point in time.

Recent evolution of media presenting devices added them capabilities of media-rendering devices—ability to play multimedia stored on directly attached storage device. For example TV sets include USB or SD ports and allow playing multimedia that has been stored on USB or SD storage device before it was connected to the TV set. Such media rendering and presenting devices require that media to be pre-recorded on stored device before attaching it to the media rendering and presenting device.

Displaying real-time or interactive media usually requires media-rendering device capable of rendering such media connected to media presenting device or media presenting and rendering device with such functionality embedded. If some form of media rendering input is not supported by specific media-rendering device or media rendering and presenting device and those devices do not provide media input to connect external media-rendering device it should be replaced entirely in order to present that form of media. Even if mentioned media rendering and/or presenting devices has storage device input it can't be used to provide the missing functionality.

In view of foregoing, there is a need for an apparatus/system and methods facilitating the rendering of live and/or interactive multimedia content using ubiquitous storage device interface.

SUMMARY OF THE INVENTION

Generally described the embodiments of the present invention provide a system, apparatus and methods for render live (real-time), remote, streamed or interactive multimedia content and transfer of that content, overcoming the problems disclosed in the prior art by leveraging storage device interface.

The principle intentions of the present invention include providing a system including a TV set with, for example, SD input, capable of playing multimedia content stored on storage device connected to the SD input. Another component of the representative embodiments is a physical device that is connected to the SD input and by emulating a SD storage device, facilitates the TV set to display live, interactive, remote or streamed multimedia content.

It should be noted that while the present invention describes a TV set as the media presenting device, it should be obvious to the skilled in art that the TV set may be substituted by any media-rendering-and-presenting device (MRPD), such as a projector, media-player connected to TV, car multimedia system or any conjunction of devices allowing the presentation of multimedia content from a storage device connected to the MRPD via a storage device interface.

It should be noted that while the present invention describes a SD input as the storage device interface, it should be obvious to the skilled in art that other storage device interfaces may be used, such as USB, SATA, eSATA, FireWire, IDE, SCSI, etc.

It should be noted that while the present invention describes a SD input as the storage device interface, it should be obvious to the skilled in art that in other embodiments, network/wireless storage device interfaces may be used, such as Wireless USB, iSCSI or AoEetc.

According to the teachings of the present invention, there is provided a media-rendering apparatus for real-time streaming of audio/video (AV) data to a media-player having one or more input direct-access-storage-device (DASD) interfaces, the apparatus including a real-time AV data source unit, an input frame buffer operatively coupled with the real-time AV data unit, an AV real-time encoder, an encoded-frames buffer, a power source, a storage-device content emulator and a DASD interface device for communicating with the media-player. Preferably, power is provided through the DASD interface device.

The real-time AV data source unit is facilitated to provide an input AV data stream, temporarily stored in the input frame buffer. The real-time encoder encodes the input AV data stream, using the encoded-frames buffer, to facilitate the media-player to play the encoded input AV data. The storage content emulator emulates a DASD content, and wherein the emulated DASD content contains the encoded input AV data. The emulated DASD content is provided to the media-player, thorough the DASD interface device.

Preferably, the real-time AV data source unit is selected from the group of devices consisting of a processor, a graphic accelerator, an AV decoder, a broadcast-TV input-device for capturing AV data, and an AV acquisition device, all of which are facilitated to render AV data into the input frame buffer.

In variations of the present invention, the media-rendering apparatus further includes a network communication device selected from the group consisting of a wired communication device, a wireless communication device and a cellular communication device. The communication device is operatively coupled with an input AV data device selected from the group of AV data input devices consisting of a processor, a graphic accelerator and an AV decoder.

Optionally, the media-rendering apparatus further includes a data input device selected from the group of devices consisting of a RAM device and a non-volatile memory device. The data input device is operatively coupled with an input AV data device selected from the group of AV data input devices consisting of a processor, a graphic accelerator and an AV decoder.

Preferably, the media-rendering apparatus further includes a human-operable input device selected from the group consisting of pushable buttons, a remote control, a mouse, a keyboard and a gaming controller. The human-operable input device is operatively connected to the media-rendering apparatus, wherein the human-operable input device is operatively coupled with an input AV data device selected from the group of AV data input devices consisting of a processor, a graphic accelerator and an AV decoder.

Optionally, the real-time AV data source unit is operatively coupled with the media-rendering apparatus.

Optionally, the real-time AV data source unit is integrated into the media-rendering apparatus.

An aspect of the present invention is to provide a method of providing real-time AV data to a media-player, the method including the steps of:
 a) identifying the media-rendering apparatus as a DASD connected to the media-player through the DASD interface device;
 b) emulating DASD content, wherein the DASD content includes emulated metadata emulating a file-system containing at least one AV data file;
 n) upon receiving a metadata-block read-request from the media-player, providing the media-player with the emulated metadata;
 d) encoding AV data by the real-time encoder of the input AV data stream; and
 e) upon receiving a block read request from the media-player, providing the media-player, just-in-time, with the encoded AV data.

Upon receiving a block read request from the media-player, the media-rendering apparatus renders and encodes the AV data and provides the encoded AV data to the media-player, in real-time.

Optionally, real-time AV source data is rendered in real-time by an input device selected from the group of devices consisting of a processor, a graphic accelerator, an AV decoder, a broadcast-TV input-device, and an AV acquisition device.

Optionally, real-time AV source is rendered in real-time using input arriving from the group of input source consisting of network, local volatile memory, non-volatile memory and a human interface device.

Optionally, the encoding of the AV data forms an encoded format facilitating a decoding process, in which the decoding of any single AV frame, encoded with the encoding format, is independent of the decoding of frames following the single AV frame.

Optionally, the encoding of the AV data is padded by null data to provide the media-player with dummy data to fill a read buffer of the media-player, to thereby minimize wait delay.

Another aspect of the present invention is to provide a method for controlling a media-rendering device, having a processor and operatively attached to a media-player as an emulated DASD, the method including the steps of:
 a) analyzing, by the processor, the sequence and rate of DASD blocks requested by the media-player, to thereby determine the use of a playback control command, issued to the media-player by an operator of the media-player;
 b) modifying the behavior of the media-rendering device in response to the playback control command; and
 c) providing the DASD blocks, requested by the media-player, with emulated encoded AV content, generated just-in-time, wherein the emulated encoded AV content is dependent modified behavior.

Optionally, the playback control command includes fast forward, rewind, pause, resume or slow motion.

Another aspect of the present invention is to provide a method for controlling a media-rendering device, having a processor and operatively attached to a media-player as an emulated DASD, the method including the steps of:
 a) providing a control command, presented on the emulated DASD as a special AV file;
 b) activating the control command by operatively selecting the special AV file to be played by the media-player;
 c) identifying the selecting of the special AV file by the media-rendering device by analyzing the sequence of DASD blocks requested by the media-player, by the processor;
 d) modifying the behavior of the media-rendering device in response to the playback control command; and
 e) providing the DASD blocks, requested by the media-player, with emulated encoded AV content, wherein the emulated encoded AV content is dependent modified behavior.

An aspect of the present invention is to provide a system for real-time presentation of AV data, the system including a media-player, facilitated to present media data from a DASD and a media-rendering device facilitated to emulate a DASD containing encoded AV data content. The devices are operatively interconnected by a DASD interface device.

The real-time AV data source unit is facilitated to provide an input AV data stream. The real-time encoder encodes the input AV data stream to facilitate the media-player to play the encoded input AV data. The storage content emulator emulates a DASD content, and wherein the emulated DASD content contains the encoded input AV data. The emulated DASD content is provided to the media-player, thorough the DASD interface device.

Optionally, the real-time AV data source unit is operatively connected to an external device selected from the group of devices consisting of a wireless network, a wired network, a broadcast AV source, a human interface device and an AV acquisition device.

Optionally, the DASD interface device is a secure digital interface device.

BRIEF DESCRIPTION OF THE DRAWINGS

The present invention will become fully understood from the detailed description given herein below and the accompanying drawings, which drawings are generally not drawn to scale and are given by way of illustration only and thus, not limitative of the present invention, and wherein.

DETAILED DESCRIPTION OF THE INVENTION

The present invention now will be described more fully hereinafter with reference to the accompanying drawings, in which drawings show preferred embodiments of the invention. Present invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which the present invention belongs. The methods and examples provided herein are illustrative only and not intended to be limiting.

By way of introduction, the principle intention of the present invention includes providing an apparatus, method and system for presenting real-time/interactive multimedia using storage device interface. The media-rendering apparatus is operatively coupled to a multimedia-player, via a particular DAS interface device. The media-rendering apparatus is facilitated to carry out the best mode of rendering and encoding AV data-stream, as requested by the multimedia-player. Reference is made to the drawings.

Figure 1:
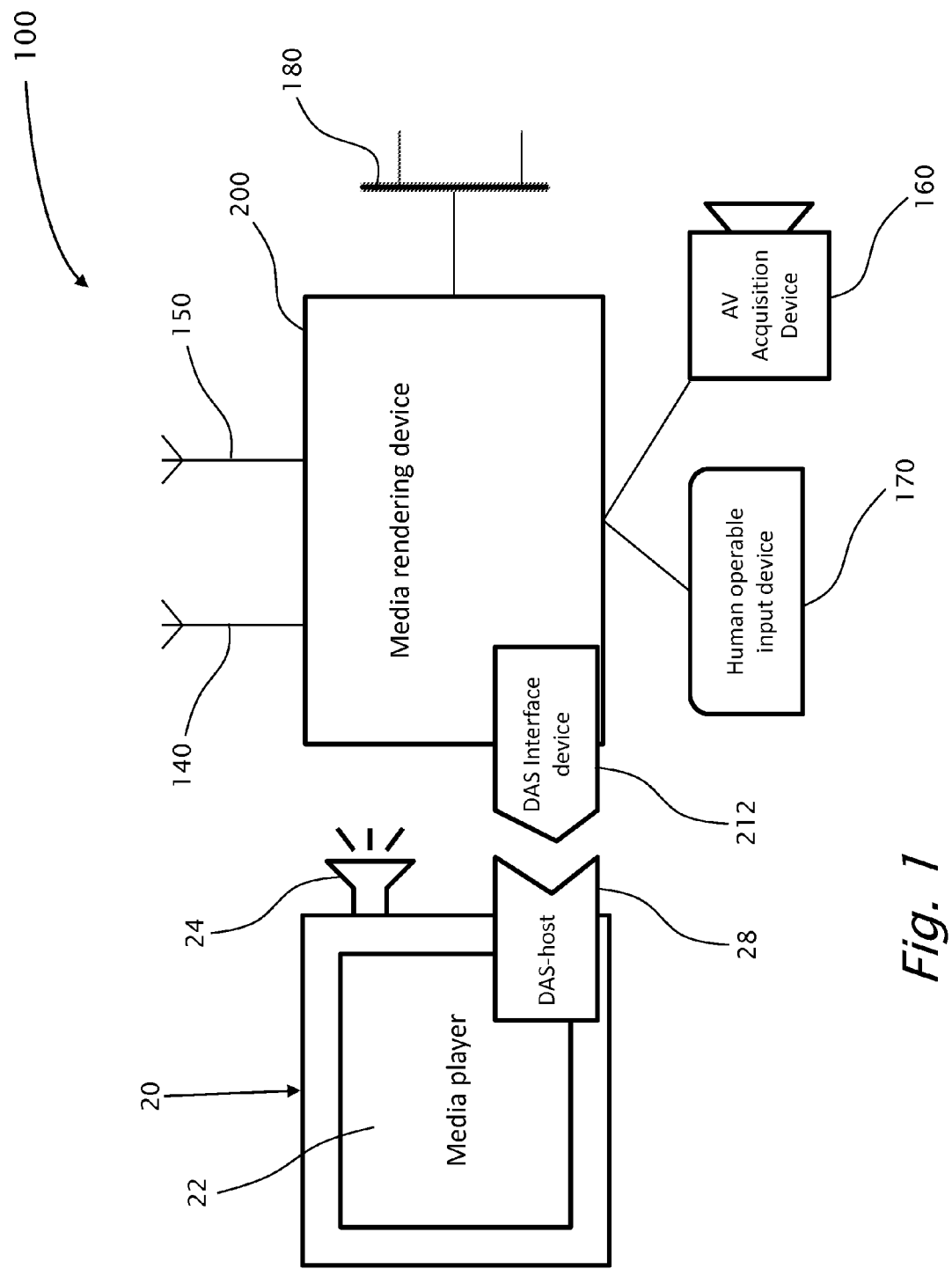
FIG. 1 is a schematic illustration of an AV real-time multimedia-streaming system, according to embodiments of the present invention, the system having a real-time media-rendering apparatus.

FIG. 1 schematically illustrates an audio-video (AV) presenting system 100, according to embodiments of the present invention. AV presenting system 100 includes a multimedia playing device 20 operatively coupled with a media-rendering apparatus 200. It should be noted that any audio and/or video output devices known in the art may be used. The system facilitates presenting AV multimedia data, generated by media-rendering apparatus 200, on media output device 20, having a media viewing device 22 and speakers 24.

Typically, Multimedia-player 20 is facilitated to present AV multimedia data stored on a directly attached storage device (DASD) by reading the multimedia data from the DASD through a storage device host interface 28. Storage device host interface 28 is using a conventional direct attached storage access protocol (such as, with no limitation, SCSI, ATA, SD/SPI), to read the content of the directly attached storage (DAS), comprehend the file-system formed on the DAS and read the content of a particular AV media file.

The content of the AV media file is decoded using one of the AV codecs supported by multimedia-player 20. The decoded AV stream is presented on the display of media viewer 22 and sound device 24. Media-rendering apparatus 200 is facilitated to generate AV data using pre-packed data inputs or/and receiving and decoding data inputs from external sources. Such external data inputs can be accessible over a wireless network 150, a wired network 180, or such data inputs can be acquired from data broadcasted over terrestrial or satellite radio waves 140.

Media-rendering apparatus 200 emulates direct attached storage on the DAS interface 212. When connected to storage interface device host 28, utilizing a storage device physical interfaces (such as, with no limitation, IDE, SATA, FireWire, Serial attached SCSI (SAS), USB and Secure Digital (SD)), media-rendering apparatus 200 present itself as DASD, formatted with a particular file-system (such as FAT file system), which file-system contains at least one media file.

When multimedia-player 20 requests at least a portion of the content of a media file, through storage interface device host 28, media-rendering apparatus 200 renders corresponding AV data stream frames of the requested AV data media, encodes the AV data stream portion into the format comprehendible by multimedia-player 20 and serves the encoded AV data stream portion as a response. Multimedia-player 20 receives the requested AV data stream portion, decodes and presents the media data contained in AV data stream viewed on screen 22 and heard via speakers 24.

Preferably, media-rendering apparatus 200 obtains power through storage interface device host 28 and can thereby, while it DAS interface connector is connected to storage interface device host 28, operate without an additional power supply.

Figure 2:
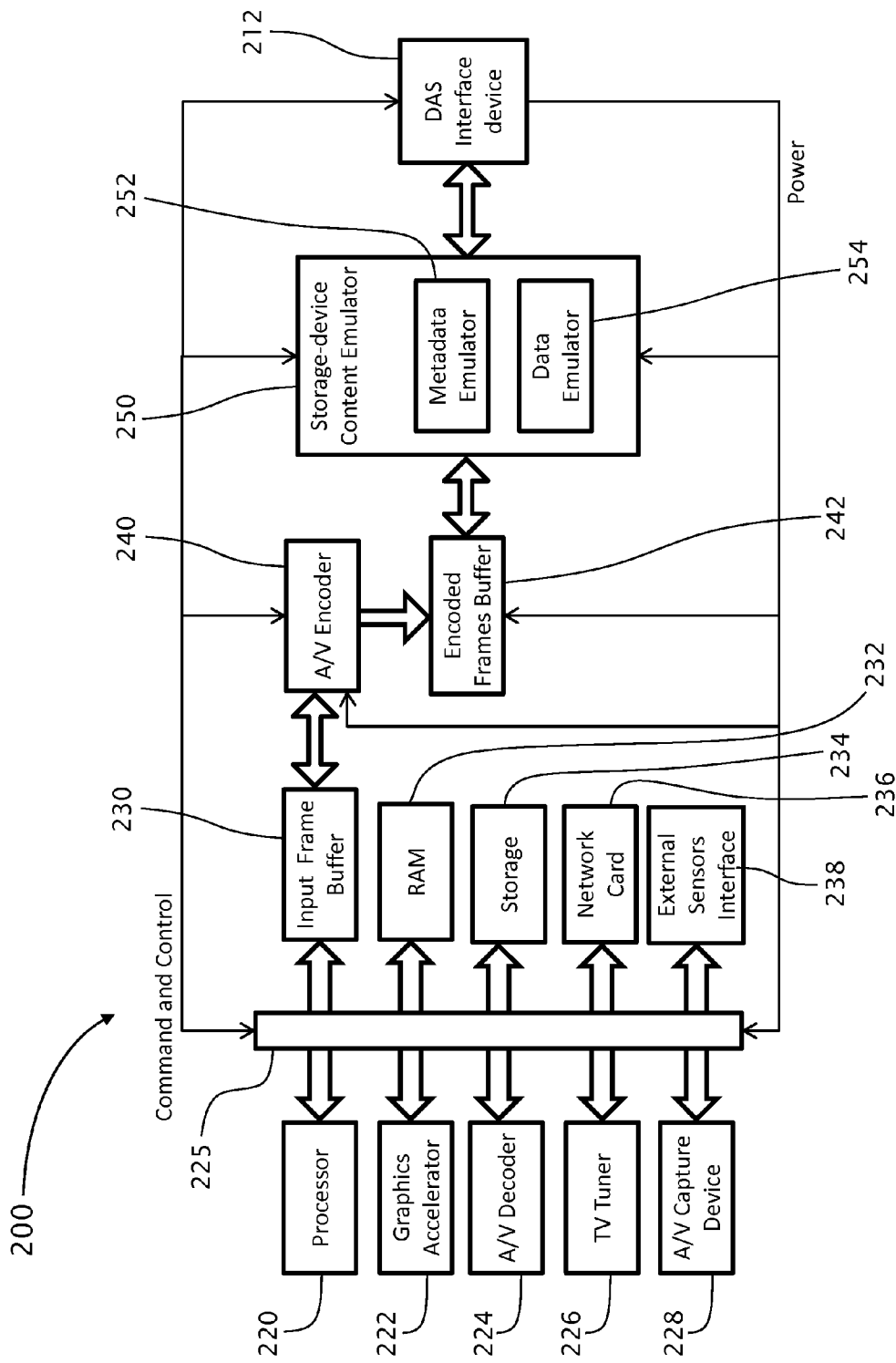
FIG. 2 is a detailed schematic illustration of the real-time, media-streaming apparatus, according to embodiments of the present invention, wherein the real-time multimedia data is transmitted to a coupled multimedia-player, via a particular DAS interface device.

Reference is also made to FIG. 2, a detailed schematic illustration of real-time, media rendering/streaming apparatus 200, according to preferred embodiments of the present invention, wherein the real-time multimedia data is rendered to a coupled multimedia-player 20, via a particular DAS interface device 212. FIG. 2 depicts the main building blocks of media-rendering apparatus 200, facilitated to carry out the best mode of rendering and encoding AV data stream, as requested by multimedia-player 20. Media-rendering apparatus 200 includes an AV real-time encoder 240, an encoded-frames buffer 242, a power source (not shown), a storage-device-content-emulator 250, having a metadata-emulator 252 and a data-emulator 254, and a DASD interface device 212 for transmitting data to a media-player 20.

An input AV data stream is obtained from a real-time AV data source such as, with no limitation, processor 220, graphic accelerator 222, AV decoder 224, TV tuner (or any other broadcast-TV input-source such as, with no limitation, cable TV and satellite TV) 226, AV capture device 228 and placed into frame buffer 230. AV real-time encoder 240 encodes the input AV data stream frames to form an encoded input AV data, temporarily stored in encoded-frames buffer 242, thereby facilitating the media-player to play the encoded input AV data. The storage-device-content-emulator 250 emulates a DASD content, wherein data-emulator 254 processes the encoded input AV data, stored in encoded frame buffer 242, to form an emulated DASD content, and wherein the emulated DASD content contains the encoded input AV data. The emulated DASD content is then provided to media-player 20, thorough DASD interface device 212.

DAS interface device 212, having an external connector (such as, with no limitation, IDE, SATA, FireWire, SAS, USB and Secure Digital (SD)), is responsible for the packet exchange with storage interface device host (also referred to as "DAS host") 28 of media-player 20. DAS interface 212 is also responsible for implementing the storage device protocol (such as, with no limitation, SCSI, ATA, SD/SPI). DAS interface 212 exchanges data packets with DAS host 28 in order to present itself to DAS host as read-only block storage device. Media-rendering apparatus 200 emulates a virtual storage device, by replying to read requests of blocks (sectors), through storage interface device host 28, using storage-device-content-emulator 250, which emulator 250 provides the requested blocks as being a virtual storage device.

Typically, the content of the virtual storage device describes a single primary partition, formatted, for example, with FAT32 file-system. It may, however, be appreciated by those skilled in the art, that any file-system understandable by media viewer can be used. Two dedicated virtual storage device areas are defined—one for the metadata and another for the file's data. The metadata area contains storage device blocks belonging to the master boot record (MBR), partition table as well as regular FAT32 metadata, including the boot sector, file allocation table and directory files content representing emulated virtual directory structure.

The virtual directory structure, emulated on virtual storage device, includes some files that are identifiable by multimedia-player 20 as media files. In the presented embodiment, the virtual directory structure contains media files representing various apparatus operation modes (such as, with no limitation, encodings, screen size, connectivity and special commands) in the form of an AV output. Files with a file name having the postfix ".MP4", indicate to the media-player 20 that the file is encoded according to the MPEG4 standard. It may, however, be appreciated by those skilled in the art, that any AV encoding format, comprehendible by media-player 20, can be used.

Each of the media operation modes, having a particular AV-output, is represented by an unbound media-stream which encoded byte size is larger than the maximum allowed file size (for example, 4 GB for FAT file-system). Such media-stream is represented by a subdirectory containing a set of files having sequential lexicographical names. Lexicographical order is chosen because media-player 20 is expected to play media files in the directory according to lexicographical order of their names. Due to limited size of emulated storage device the set of files represent only a limited portion of the output AV data stream, spliced into slices of not larger than the maximum allowed file-size (by the file system). First (lexicographically) file represents the beginning of the AV data stream-portion (slice).

Storage-device-content-emulator 250 includes metadata-emulator 252 and data-emulator 254. A/V encoder 240 utilizes encoded frames buffer 242 to provide data-emulator 254 with encoded content of AV data that data-emulator 254 will in turn provide to DAS interface. Metadata-emulator 252 is responsible to serving the blocks belonging to FAT32 metadata, partition table and MBR.

Figure 3:
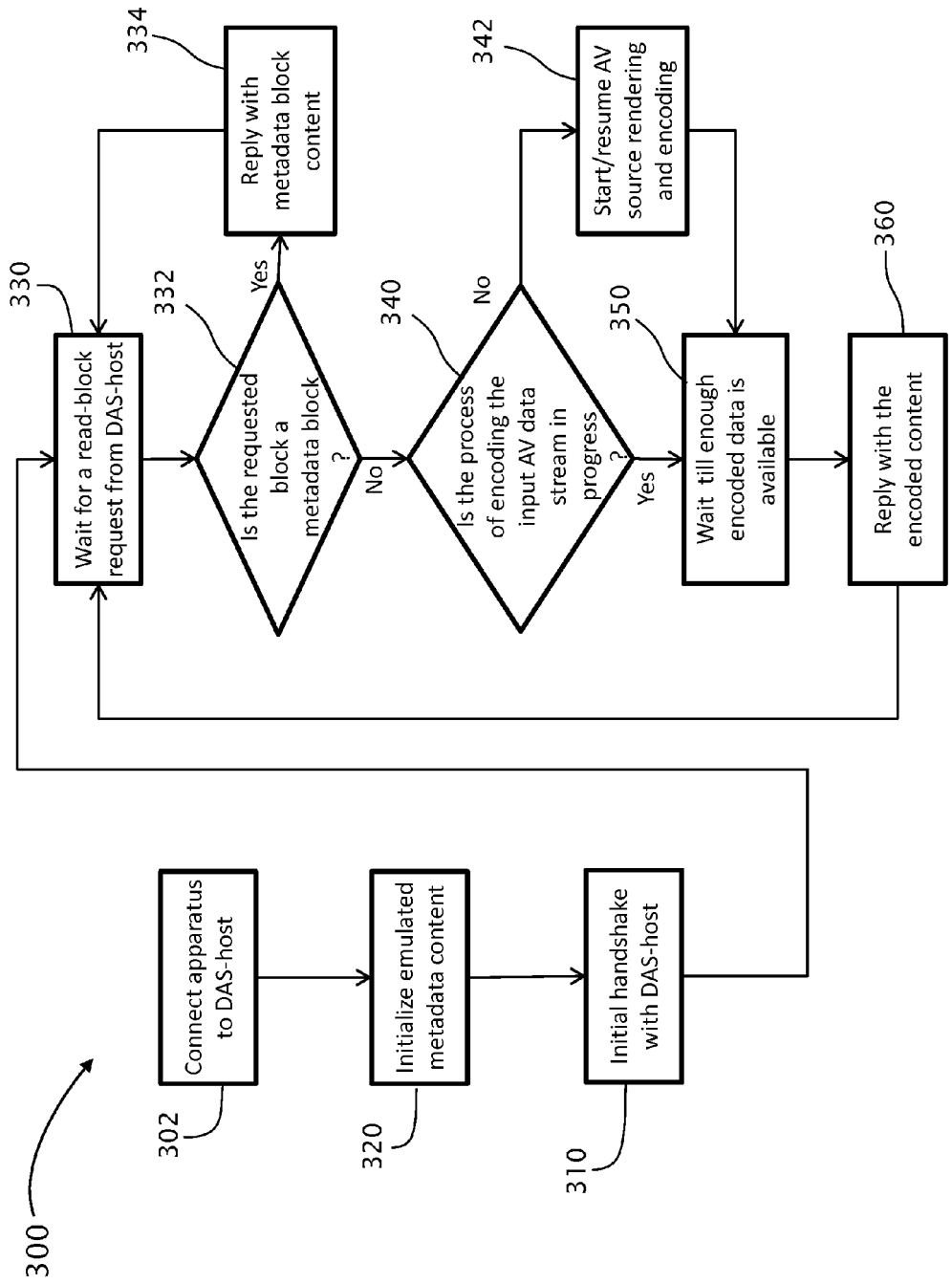
FIG. 3 is a schematic flow diagram that outlines the steps of emulating a DASD, wherein the AV multimedia data is generated in real-time from an AV data source, according to embodiments of the present invention.

Reference is also made to FIG. 3, a detailed schematic illustration of method 300 of emulating a DASD when the emulated content of the storage device is generated in real-time from AV source to facilitate the media-player to play the input AV data source. According to preferred embodiments of the present invention, when an initial or renewed connection to a virtual storage device (step 302) is made by DAS host (step 310), metadata-emulator 252 builds a virtual directory structure, containing AV media files/directories representing various apparatus modes of operation, in the form of an AV output, and thereby calculate different virtual storage device properties (step 320). It should be noted that the emulated metadata may not be prepared ahead of time and may be prepared in real-time, upon request. Metadata-emulator 252 internally stores the resulting emulated data content related to a partition table, the boot sector, file-allocation-table (FAT), directory files, etc. Metadata-emulator 252 maintains a mapping from virtual storage device block address to the media file representing the AV output of a particular apparatus mode of operation. Method 300 proceeds with the following steps:

Step 330: wait for a read-block request from DAS-host 28.
Storage-device-content-emulator 250 is operatively activated by a read-block request from DAS-host 28.
Step 332: check whether the requested block is a metadata block.
Firstly, storage-device-content-emulator 250 differentiates whether the requested block belongs to metadata area.
If the requested block is not a metadata block, go to step 340.
Step 334: reply with metadata block content.
If the requested block is a metadata block, metadata-emulator 252 provides media-player 20 with the emulated metadata content, as described hereabove.
Step 340: check whether the encoding process of the input AV data stream portion is in progress.
When the block being read belongs to a file representing the AV data stream portion, metadata-emulator 252 maps the address of the read-block to facilitate identification of media-stream portion representing AV output of particular apparatus operation mode. Metadata-emulator 252 also maps the address of read-block to read-block offset relative to the beginning of the current media-stream portion. The media-stream portion identification and offset is provided to data-emulator 254.
Data-emulator 254 checks whether the encoding process of the media-stream portion is in progress.
If the requested media data block belongs to the particular media-stream portion that is being rendered, go to step 350.
Step 342: start/resume AV source rendering and encoding.
If the requested media data block belongs to particular media-stream that is not being rendered, data-emulator 254 instructs processor 220 to start/resume rendering and encoding the corresponding input AV media data.

Step 350: wait till enough encoded data is available.

Data-emulator 254 waits till encoded-frames buffer 242 accumulates at least the number of bytes equivalent to the specified size of the requested block.

Step 360: reply with the encoded content.

As soon as there is enough encoded data in encoded-frames buffer 242, amount of accumulates number of bytes at least equivalent to the specified size of the requested block, the accumulated bytes are consumed from encoded-frames buffer 242 and provided to media-player 20 in response to the read-block request.

Figure 5:
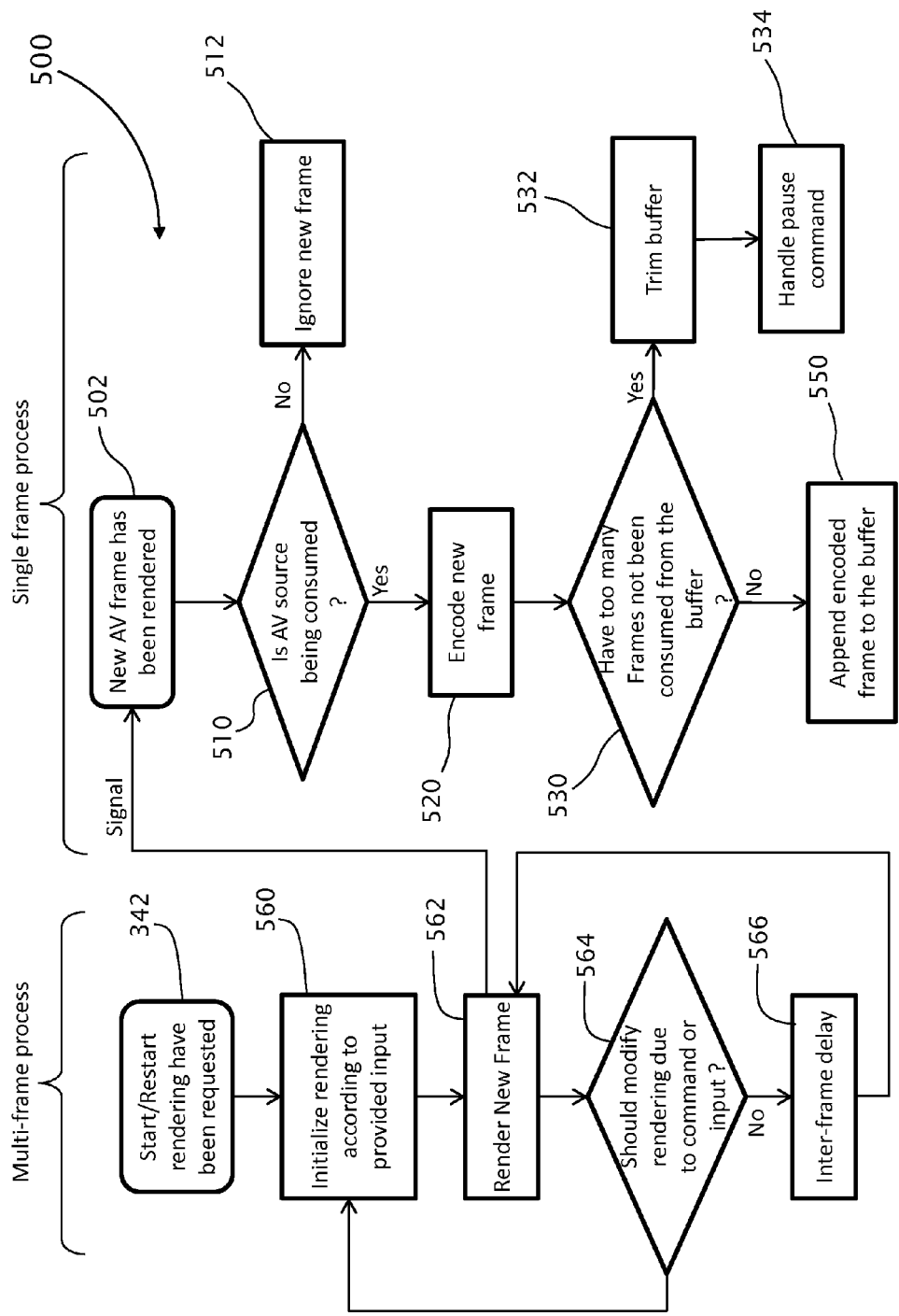
FIG. 5 is a schematic flow diagram that outlines the steps of a detailed method of rendering and encoding AV input data, according to embodiments of the present invention.

Reference is now also made to FIG. 5, a schematic flow diagram that outlines a method 500 of a detailed method of rendering and encoding AV input data, according to embodiments of the present invention. When instructed to start/resume rendering media that has not been rendered currently (see step 342), processor 220 is provided with an identifier of the AV media-stream requested to be rendered. It should be noted that processor 220 may obtain additional AV media rendering input, using a wireless network controller 236, a wired network controller 236, a TV tuner (or any other broadcast-TV input-source such as, with no limitation, cable TV and satellite TV) 226, AV capture device 228, such as, with no limitation, a video camera (160) or a microphone, external sensors interface 238, such as, with no limitation, a GPS, which external sensors interface 238 may be operationally connected to human operable input device 170, such as, with no limitation, a joystick or a game-pad, or the AV media rendering input may already be stored on a flash memory storage 234 or RAM 232. It should be further noted that application code executed by processor 220 facilitated to render AV media may be considered as AV media rendering input as well as other input describing media in a format that can be rendered by processor 220 and/or by graphic accelerator 222 and/or by AV decoder 224.

Method 500 includes the following steps:

Step 560: initialize rendering according to provided input.

The input includes, but is not limited to media-stream identity, the address of the requested block that causes the rendering to start/resume an identified player command, an internal apparatus state and additional external inputs.

Typically, the initialization also includes clearing previously stored buffer content.

Step 562: render a new frame.

Processor 220 renders AV media frames into AV input frame buffer 230, at a preconfigured frame rate, optionally using an AV decoder 224, graphic accelerator 222, TV tuner 226, AV capture device 228 or executed application-code that render AV frames into input frame buffer 230.

Step 502: notify that a new AV frame has been rendered.

Processor 220 notifies AV encoder 240 as soon as the first/next AV frame is ready in encoded frame buffer 242.

Step 510: check whether the AV input frame is being consumed.

If the AV input frame is not being consumed, ignore the input frame (step 512) and go to step 562.

Step 520: encode a new frame.

AV encoder 240 encodes the frame placed into input frame buffer 230 into corresponding portion of an encoded media data stream, such as, with no limitation, an MPEG-4 stream. In preferred embodiment of the present invention, the MPEG-4 encoder avoids using B-frames facilitating a decoding process, in which process the decoding of any single AV frame, encoded with that encoding format, is independent of the decoding of frames that follow the single AV frame.

Step 530: check whether too many frames have not been consumed from encoded frame buffer 242.

Monitor encoded frame buffer 242 to see that it is over filled. If too many frames were not consumed from encoded frame buffer 242, go to step 532.

Step 550: append the last encoded frame (as described in step 520) to encoded frame buffer 242.

If not too many frames were consumed from encoded frame buffer 242, proceed with the encoding process and AV encoder 240 stores the encoded media data portion into encoded frame buffer 242.

Step 532: trim encoded frame buffer 242.

Processor 220 notifies AV encoder 240 about every new frame rendered into input frame buffer 230 and in turn, AV encoder 240 repeats the encoding process. When there is an overflow of encoded frames buffer 242 AV encoder 240 removes from the encoded frames buffer 242 all the data besides the remainder of the last served frame (if there is such), and resumes accumulation of encoded AV data stream, with the next rendered frame. Continue with handling a pause command (see step 534, ahead).

Upon rendering a new frame, made available to step 502 at step 562, processor 220 also initiates a monitoring loop that facilitates processor 220 to render sequential frames, while keeping inter frame delay to provide consistent frame rate, the monitoring loop including the following steps:

Step 564: check whether the rendering of frames should be modified due to an interrupting command or input.

Special interrupting command or special input may cause a modification of the rendering process, commands such that, fast-forward, rewind, jump, etc. Additional input may arrive from a human operator using a human operable input device and cause the rendering to be altered to consider such new input and facilitate rendering of interactive AV content.

Step 566: inter-frame delay.

Control a consistent rate rendering of frames.

Go to step 562.

Figure 4:
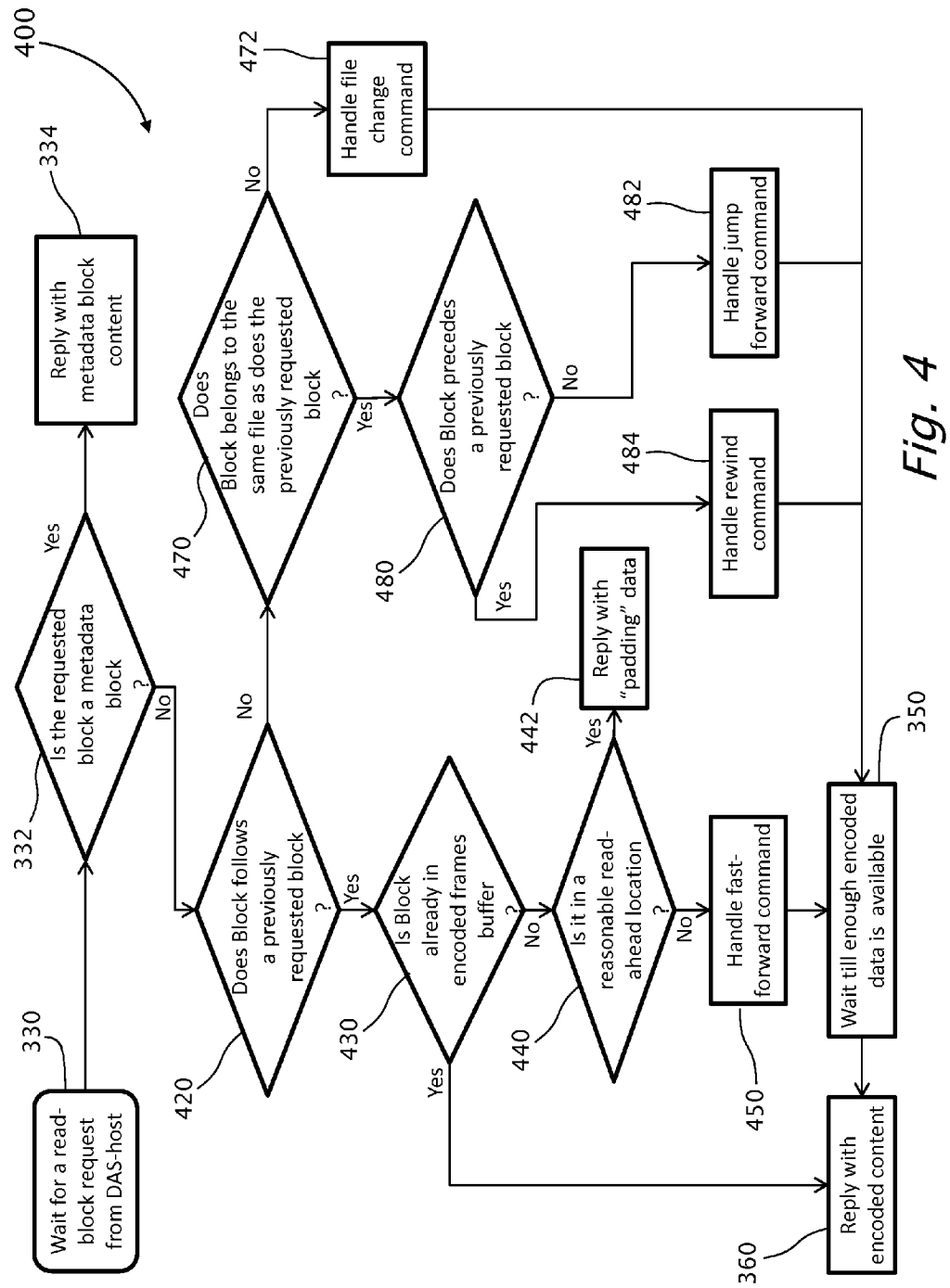
FIG. 4 is a schematic flow diagram that outlines the steps of a method of providing real-time of AV data to a media-player, according to embodiments of the present invention.

Reference is now also made to FIG. 4, a schematic flow diagram that outlines the steps of a method 400 for providing real-time of AV data to a media-player 20, according to embodiments of the present invention. FIG. 4, a detailed schematic illustration of extended variation of method of emulating a DASD when the emulated content of the storage device is generated in real-time from an input AV source to facilitate media-player 20 to play the input AV source. When requests for sequential blocks arrive to data-emulator 254, the blocks are served from encoded frames buffer. When encoded frames buffer 242 does not have enough data to serve block read request data-emulator 254 may wait till enough data is accumulated, before responding to read block request.

Method segment 400 is concerned with the handling of requests, issued by media-player 20, for data blocks containing media data. Method segment 400 includes the following steps of processing media data blocks:

Step 420: check whether the requested block that immediately-follows a previously requested block.

If the requested block does not immediately-follow a previously requested block, go to step 470.

Step 430: check whether the requested block is already in encoded frames buffer 242.

If the requested block is already in encoded frames buffer 242, go to step 360, that is, response to the request with the corresponding encoded block content.

Emulating a DASD, to facilitate streaming of real-time rendered and interactive content, may require minimizing the delay between the time a new AV frame is rendered by media-rendering apparatus 200 and the time new AV frame is presented on screen 22 of media-player 20. Media-player 20 may include read-ahead buffer and may delay the displaying of frames due to requirement to fill the read-ahead buffer of the media-player before rendering the frame. Method segment 400 further describes how to avoid a read-ahead delay:

Step 440: check whether the requested block is in a reasonable read-ahead location:

When a sequential read request arrives (step 420), and the requested block is not found in encoded frames buffer (step 430), the method assumes that media-player 20 is requesting this read to satisfy read-ahead requirements. However it is assumed that a reasonable read-ahead buffer-size may be preconfigured and thus sequence of read-requests longer that maximum read-ahead buffer size will be considered unreasonable read-ahead. If read request is considered as reasonable read-ahead continue to step 442, otherwise go to step 450

Step 442: reply with "padding" data.

If read block request considered as read-ahead reply to read request with special "padding"/null data. In preferred embodiments of the invention, the null data are MPEG-4 stream atoms, well known in art, that are ignored by the MPEG-4 AV decoder of media-player 20.

Commands issued to media-player 20 by a human operator, and being executed by media-player 20, can be identified by media-rendering device 200 by analyzing the rate of block-read requests arriving to data-emulator 254, and by analyzing the address of the requested blocks. Requesting, by media-player 20, sequential AV stream blocks, in a rate significantly faster than required to render the stream in its normal frame rate, may be identified as a fast forward command. Requesting non sequential AV stream blocks may be identified as a jump backward command, if the requested block precedes previously requested block. Requesting non sequential AV stream blocks may be identified as jump forward if requested block follows previously requested block with gap. Sequentially requesting portions of AV stream in a reverse order (descending offsets) may be identified as a rewind command.

Data-emulator 254 uses requested block address/offset (steps 440, 470, 480) to identify that media-player 20 has instructed to execute one of the following commands: fast forward (step 450), jump forward (step 482) and rewind (step 484). Identifying and handling of the pause/stop command, was already described in steps 530, 534 and identifying and handling of the play/resume command, was already described in steps 340, 342.

Method segment 400 further describes how to identify and handle fast forward, jump-forward and rewind commands:

Step 450: handle fast-forward command.

If the requested block immediately-follows a previous requested block (step 420), the request cannot be fulfilled by encoded frames buffer 242 (step 430) and the request is not in a reasonable read-ahead location (step 440), it is identified as fast-forward command. The command is delivered to processor 220 that handles the command according to step 564, facilitating media-rendering apparatus 200 to render interactive media content and provide a feedback to the human operator. The method continues with step 350 to wait for results of the command handling and reply with newly rendered and encoded content (step 360).

Step 470: check whether the requested block belongs to the same data file as does the previously requested block.

If the requested block does not follow the previous requested block (step 420), than some playback commands have been issued by the operator of media-player 20.

If the requested block belongs to the same data file as does the previously requested block, go to step 480, otherwise go to step 472

When storage-device-content-emulator 250 identifies a request of block belonging to different file, emulator 250 carries out preconfigured actions, associated with that command file.

Step 480: check whether the requested block precedes the previously requested block.

If the requested block does not follows the previous requested block (step 420) and the requested block belongs to the same file as does the previous requested block (step 470) than it is identified as jump command.

If the requested block precedes the previously requested block, go to step 484, otherwise go to step 482.

Step 482: handle jump forward command.

If the requested block does not immediately-follows the previous requested block (step 420) and the requested block belongs to the same file as does the previous requested block (step 470) and the requested block precedes the previously requested block (step 480) than jump forward command is identified.

The command is delivered to processor 220 that handles the command according to step 564, facilitating media-rendering apparatus 200 to render interactive media content and provide a feedback to the human operator. The method continues to step 350 to wait for results of the command handling and reply with newly rendered and encoded content (step 360)

Step 484: handle rewind command.

If the requested block does not immediately-follows the previous requested block (step 420), the requested block belongs to the same file as does the previous requested block (step 470) and the requested block does not precedes the previously requested block (step 480), than a rewind command is identified.

The command is delivered to processor 220 which handles the command according to step 564 facilitating media-rendering apparatus 200 to render interactive media content and provide a feedback to the human operator. The method continues to step 350 to wait for results of the command handling and reply with newly rendered and encoded content (step 360)

Step 534: handle pause command.

If too many frames were not consumed from encoded frame buffer 242 it is assumed that media-player 20 stopped/paused/slowed down playing currently rendered media-stream e.g. pause/stop command is identified.

The command is delivered to processor 220 which handles the command according to step 564. Processor 220 may decide to stop/pause rendering loop or to ignore it and continue rendering new frames.

In embodiment of the present invention, one or more special media files, referred to as "command files", are included in the virtual directory structure emulated by storage-device-content-emulator 250. File names represent commands comprehended by a human operator of media-player 20, for example, file name "Turn Off". The size of the files returned is enough to contain a limited encoded AV data stream. When storage-device-content-emulator 250 identifies a request being a command file, media-rendering apparatus 200 carries out preconfigured actions associated with that command file.

Method segment 400 further includes the following steps:
Step 472: handle file change command.

If the requested block does not immediately-follows the previous requested block (step 420) and the requested block does not belongs to the same file as does the previous requested block (step 470) file change command is identified.

The command is delivered to processor 220 which handles the command according to step 564. The processor may identify new file as continuation of the same media-stream and proceeds rendering process as if no change have been occurred.

Otherwise processor 220 identifies that particular command have been issued by interpreting the input AV media-stream identifier and follows to step 560 facilitating media-rendering apparatus 200 to render interactive media content and provide a feedback to the human operator.

Processor 220 executes some task or activity related to particular command, for example, schedules shut down of the apparatus 200. and initializes the rendering of reply AV stream (step 560) and typically, also trimming (step 532) previous content from encoded-frames buffer 242. The reply AV stream may, for example, include turn-off animation.

The step 472 continues to step 350 to wait for results of the command handling and reply with newly rendered and encoded content (step 360)

The preferred embodiment described hereabove uses processor 220 to facilitate command and control logic. It would be obvious to one skilled in the art that similar logic may be realized without a processor unit. The preferred embodiment described hereabove uses processor 220 to facilitate rendering of AV stream. It would be obvious to one skilled in the art that other AV rendering devices (including, but is not limited to 222, 224, 226, 228) can be facilitated to store AV stream into frame buffer 230 without using such processor.

The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of providing real-time AV data to a media-player, the method comprising the steps of:
   a) providing a media-generating apparatus operatively connected to the media-player by a DASD interface device, said media-generating apparatus including:
      i. a real-time AV data generation unit, configured to generate and provide AV data frames;
      ii. an input device for obtaining input data;
      iii. an AV real-time encoder;
      iv. a storage-device content emulator;
      v. a frame synchronization unit; and
      vi. a DASD interface device for communicating with the media-player;
   b) disguising said media-generating apparatus as being a DASD connected to the media-player through said DASD interface device;
   c) emulating DASD content, wherein said emulated DASD content includes an emulated file-system containing metadata of at least one emulated AV data file; and
   d) upon receiving a read-request for a block of an AV data file from the media-player, providing the media-player with a block of said at least one emulated AV data file, comprising the steps of:
      i. generating at least one frame of said AV data frames by said real-time AV data generation unit, according to said input data;
      ii. encoding said at least one generated AV data frame by said real-time encoder to form a block of encoded AV data; and
      iii. serving the media-player with said block of encoded AV data, wherein said frame synchronization unit synchronizes between said serving the media-player; with said block of encoded AV data file and said generation and encoding of said AV data frames, to thereby provide said encoded AV frames to the media-player just-in-time, and thereby minimize the frame presentation delay.

2. The method as in claim 1, wherein said frame synchronization unit triggers said media generating apparatus to generate and encodes said AV data frame to form a block of encoded AV data, wherein responding to said read-request is delayed until said generation and encoding is complete, such that said encoded AV data can be provided to the media-player just-in-time, to minimize presentation delay of the said generated frames.

3. The method as in claim 1, wherein said real-time AV generation unit is a processor, a graphic accelerator or a combination thereof.

4. The method as in claim 1, wherein said input device is a human interface device including a push button, a keyboard, a mouse, a touch screen and a joy stick, facilitating interactive, real-time AV data generation.

5. The method as in of claim 1, wherein said encoding of said AV data forms an encoded format facilitating minimal delay for the frame presentation process of the media-player, in which process the decoding of any single AV frame, encoded with said encoding format, is independent of the decoding of frames following said single AV frame.

6. The method as in of claim 1, wherein said encoding of said AV data is padded by null data to provide the media-player with dummy data to fill a read ahead buffer of the media-player, to thereby minimize frame presentation delay.

7. The method as in claim 1, wherein said frame synchronization unit delays responding to said read-request until said real-time AV data generation unit completes generating said at least one frame of said AV data frames, and AV real-time encoder encodes at least one said generated AV frame to form a block of encoded AV data, such that said encoded AV data can be provided to the media-player just-in-time, to minimize presentation delay of said generated frames.

8. The system according to claim 1, wherein said input device is external sensor including a GPS and an accelerometer.

9. The system according to claim 1, wherein said input device is duplex wireless network communication device.

10. A method of providing real-time AV data to a media-player, the method comprising the steps of:
    a) providing a media-rendering apparatus operatively connected to the media-player by a DASD interface device, said media-generating apparatus including:
       i. a real-time AV data rendering unit, configured to render and provide AV data frames;
       ii. an input device for obtaining input data;
       iii. an AV real-time encoder;

iv. a storage-device content emulator;
v. a frame synchronization unit; and
vi. a DASD interface device for communicating with the media-player;

b) disguising said media-rendering apparatus as being a DASD connected to the media-player through said DASD interface device;

c) emulating DASD content, wherein said emulated DASD content includes an emulated file-system containing metadata of at least one emulated AV data file; and d) upon receiving a read-request for a block of an AV data file from the media-player, providing the media-player with a block of said at least one emulated AV data file, comprising the steps of:
i. rendering at least one frame of said AV data frames by said real-time AV data generation unit, according to said input data;
ii. encoding said at least one rendered AV data frame by said real-time encoder to form a block of encoded AV data; and
iii. serving the media-player with said block of encoded AV data, wherein said frame synchronization unit synchronizes between said serving the media-player with said block of encoded AV data file and said rendering and encoding of said AV data frames, to thereby provide said encoded AV frames to the media-player just-in-time, and thereby minimize the frame presentation delay.

11. The method as in claim 10, wherein said frame synchronization unit triggers said media-rendering apparatus to render and encode said AV data frame to form a block of encoded AV data, wherein responding to said read-request is delayed until said generation and encoding is complete, such that said encoded AV data can be provided to the media-player just-in-time, to minimize presentation delay of the said rendered frames.

12. The method as in claim 10, wherein said real-time AV rendering unit is a processor, a graphic accelerator or a combination thereof.

13. The method as in claim 10, wherein said real-time AV rendering unit is a digital AV decoder.

14. The system according to claim 10, wherein said input device is duplex wireless network communication device.

15. The method as in of claim 10, wherein said encoding of said AV data forms an encoded format facilitating minimal delay for the frame presentation process of the media-player, in which process the decoding of any single AV frame, encoded with said encoding format, is independent of the decoding of frames following said single AV frame.

16. The method as in of claim 10, wherein said encoding of said AV data is padded by null data to provide the media-player with dummy data to fill a read ahead buffer of the media-player, to thereby minimize frame presentation delay.

17. The method as in claim 10, wherein said frame synchronization unit delays responding to said read-request until said real-time AV data rendering unit completes generating said at least one frame of said AV data frames, and AV real-time encoder encodes at least one said generated AV frame to form a block of encoded AV data, such that said encoded AV data can be provided to the media-player just-in-time, to minimize presentation delay of said rendered frames.

* * * * *